United States Patent
Pearson et al.

(10) Patent No.: US 12,373,610 B1
(45) Date of Patent: Jul. 29, 2025

(54) WRITE PROTECTION USING AN IMMUTABLE ROOT OF TRUST

(71) Applicant: Amazon Technologies, Inc., Seattle, WA (US)

(72) Inventors: Adrian Pearson, Battle Ground, WA (US); Rolf Peter Neugebauer, Cambridge (GB); Benjamin Serebrin, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 18/066,065

(22) Filed: Dec. 14, 2022

(51) Int. Cl.
*G06F 21/78* (2013.01)
*G06F 21/57* (2013.01)
*G06F 21/64* (2013.01)

(52) U.S. Cl.
CPC ............ *G06F 21/78* (2013.01); *G06F 21/575* (2013.01); *G06F 21/64* (2013.01)

(58) Field of Classification Search
CPC ......... G06F 21/78; G06F 21/575; G06F 21/64
See application file for complete search history.

(56) References Cited

U.S. PATENT DOCUMENTS

| | | | | |
|---|---|---|---|---|
| 8,386,763 B1* | 2/2013 | Spangler | ............... | G06F 21/575 713/1 |
| 8,566,940 B1* | 10/2013 | Rudelic | ............... | G06F 12/1425 711/100 |
| 11,586,446 B1* | 2/2023 | Sundararaman | ...... | G06F 13/409 |
| 2006/0111889 A1* | 5/2006 | Bress | ................... | G06F 11/261 703/23 |
| 2008/0250509 A1* | 10/2008 | Ahvenainen | ........ | G06F 12/1441 726/34 |
| 2009/0121028 A1* | 5/2009 | Asnaashari | ......... | G06F 12/0238 235/492 |
| 2009/0245521 A1* | 10/2009 | Vembu | .................. | G06F 21/606 380/279 |

(Continued)

OTHER PUBLICATIONS

JEDEC Standard No. 220E (JESD220E), "Universal Flash Storage (UFS): Version 3.1", Jan. 2020, Sections 12-13.2 (pp. 245-302) and Section 14.2 (pp. 374-378), URL: https://www.jedec.org/system/files/docs/JESD220E.pdf.

(Continued)

*Primary Examiner* — Daniel B Potratz
*Assistant Examiner* — Matthias Habtegeorgis
(74) *Attorney, Agent, or Firm* — Weaver Austin Villeneuve & Sampson LLP

(57) ABSTRACT

Described are techniques for write protecting a non-volatile memory (NVM) after the contents of the NVM have been set. In some examples, a computing device or system having an NVM also includes a Root of Trust (RoT) configured to generate a write protect command as an input to the NVM. The RoT generates the write protect command in response to detecting a write protect signal from an electronic controller. The write protect command sets one or more areas in the NVM to be read-only. Further, the write protect command can make the one or more areas read-only on a power-on basis so that write protection is maintained until the next power cycle. The electronic controller can be configured to assert the write protect signal each time the computing device or system is powered on, for instance during a reboot, thereby causing the RoT to renew the write protection.

20 Claims, 8 Drawing Sheets

(56) References Cited

U.S. PATENT DOCUMENTS

| | | | | |
|---|---|---|---|---|
| 2013/0097655 | A1* | 4/2013 | Vaidyanathan | G06F 21/55 726/1 |
| 2013/0188437 | A1* | 7/2013 | Jarmay | G06F 12/1433 365/228 |
| 2013/0268802 | A1* | 10/2013 | Ito | G06F 12/1441 714/6.11 |
| 2018/0173644 | A1* | 6/2018 | Koeberl | G06F 12/1416 |
| 2019/0370044 | A1* | 12/2019 | Tsirkin | G06F 12/109 |
| 2019/0391864 | A1* | 12/2019 | Das | G06F 1/325 |
| 2020/0042747 | A1* | 2/2020 | Yu | G06F 21/78 |
| 2020/0097313 | A1* | 3/2020 | Dong | G06F 12/1036 |
| 2021/0210029 | A1* | 7/2021 | Zhang | G09G 3/36 |
| 2021/0224426 | A1* | 7/2021 | Cui | G06F 21/74 |
| 2021/0406361 | A1* | 12/2021 | Soenkens | G06F 21/445 |
| 2022/0060339 | A1* | 2/2022 | Ballard | H04L 9/0643 |

OTHER PUBLICATIONS

JEDEC Standard No. 84-B51A (JESD84-B51A), "Embedded Multi-Media Card (e•MMC) Electrical Standard (5.1A)", Jan. 2019, Sections 7.3-7.4, pp. 164-231, URL: https://www.jedec.org/system/files/docs/JESD84-B51A.pdf.

\* cited by examiner

WRITE PROTECTION USING AN IMMUTABLE ROOT OF TRUST

BACKGROUND

Modern computer systems are usually formed of components that are manufactured and/or configured by different entities. In some instances, a computer system can include components configured by a service provider for use by a client. For example, a provider of cloud services may host computing resources on behalf of different enterprise customers. The cloud service provider may perform some initial configuration of the resources prior to handing over access or control of the resources to a client. As one example, the cloud service provider may set up a virtual machine instance on a server computer for execution of software supplied by the client. Handover may involve giving physical possession or remote control of the server to the client. The cloud service provider may have limited control over how the resources are used once access or control has been given to the client. In order to prevent the resources from being compromised (e.g., through installation of malware or accidental misconfiguration), it may be beneficial to put into place security mechanisms that permit the cloud service provider to monitor and/or prevent tampering with the resources.

BRIEF DESCRIPTION OF THE DRAWINGS

Various embodiments in accordance with the present disclosure will be described with reference to the drawings, in which.

DETAILED DESCRIPTION

Figure 1:
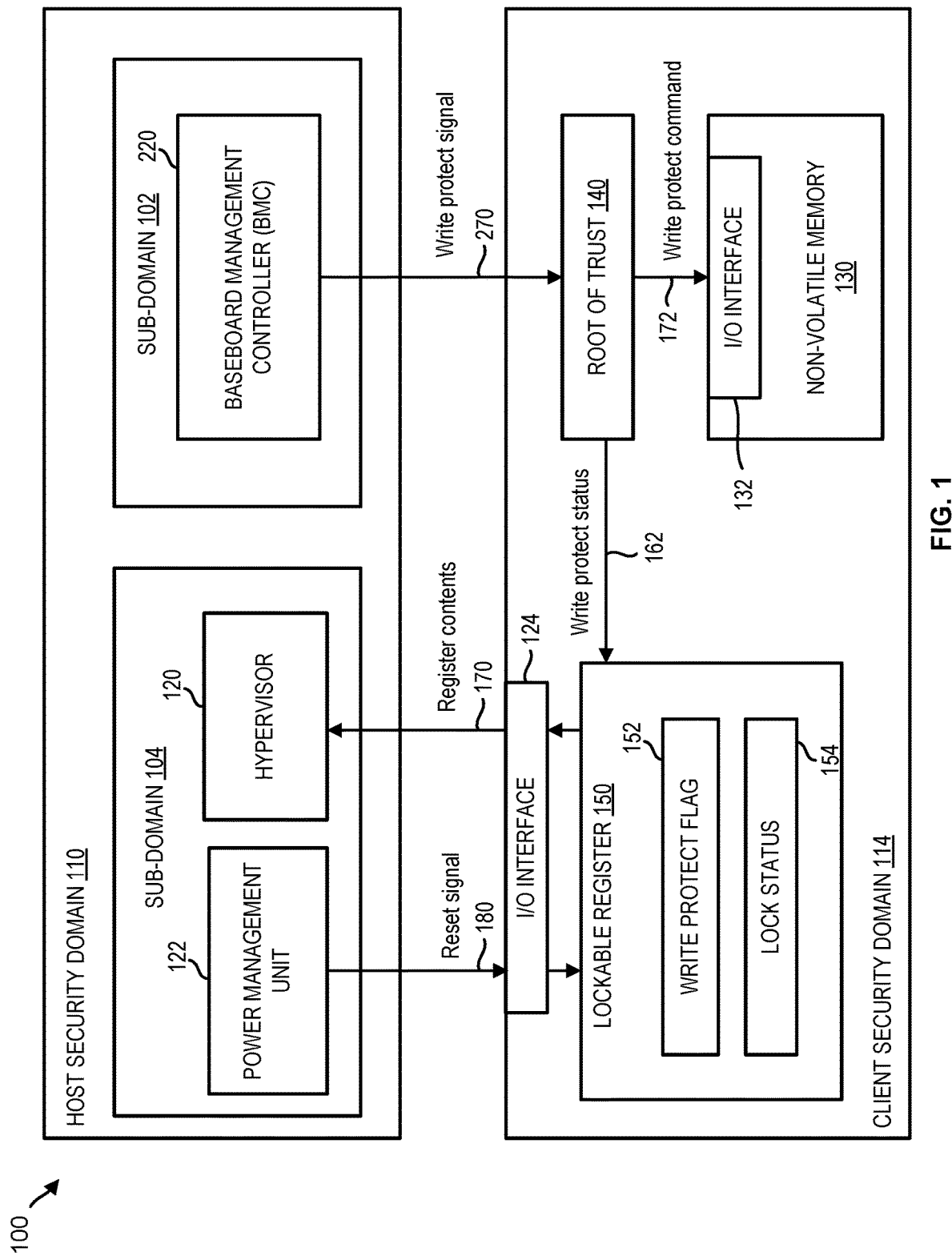
FIG. 1 shows an example of a write protection scheme according to some embodiments.

Disclosed herein are techniques for write-protecting a memory in a computer system based on a write protect signal. More specifically, aspects of the present disclosure relate to configuring write protection on a memory device that does not support direct input of a write protect signal. In such instances, the memory can be write-protected through input of a command generated in response to the write protect signal, in order to set one or more areas within the memory to be read-only. In some implementations, the memory device is a non-volatile memory storing content that is processed by a computing device or system as part of a boot sequence. For instance, the memory device can be a flash technology based memory storing boot code that is executed each time the computing device or system is powered on.

Additionally, aspects of the disclosure relate to setting up write protection in a secure and verifiable manner. As mentioned above, modern computer systems are usually formed of components manufactured and/or configured by different entities. For instance, in a computer system where a memory is write-protected based on a write protect signal, the memory could be manufactured by a first entity, incorporated into the computer system by a second entity that writes to the memory and configures a first component to generate the write protect signal, and then read by a second component configured by an end-user. In order to establish write protection securely, certain embodiments may utilize an immutable root of trust (RoT) to process a write protect signal. The RoT is immutable in the sense that it is preconfigured to process the write protect signal in a fixed manner and attempts to alter the behavior of the RoT may cause irreparable damage or render the RoT inoperable. The RoT can be implemented in hardware and/or software and, in some embodiments, corresponds to firmware code supplied by a trusted entity that also configures a security controller to assert the write protect signal each time the computer system or device is powered on.

In order to verify that write protection has been established, an RoT may be configured to provide access to information on the write-protect status of a memory. In particular, some embodiments may feature a hardware register that stores a flag (e.g., a Boolean value) indicating whether write protection has been set on the entire memory or on specific portions of the memory. Further, the hardware register can be a lockable register that is unlocked only when the contents of the hardware register are being updated and then locked again once the update is finished. The locking and unlocking can be performed by the RoT and may involve, for example, locking the hardware register after setting the flag to indicate that the memory is currently in a write-protected state.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In the following description, references are made to various signals and information communicated between components or devices. In some instances, signals and information may have a particular format or be communicated using a specific transmission medium. For example, aspects of the disclosure relate to the handling of a write protect signal which can be, but is not necessarily limited to, a digital signal communicated by wire line. As another example, instructions or commands can be in the form of a digital message containing bit fields (operational code, operand, memory address location, etc.) arranged in accordance with the receiving device's instruction set architecture. Unless expressly stated or otherwise indicated by context, signals and information may be represented using any of a variety of different technologies and techniques. For example, data, instructions, commands, information, signals, or bits that may be referenced throughout the description and accompanying drawings may be represented by voltages, currents, electromagnetic waves, magnetic fields or particles, optical fields or particles, or any combination thereof. Further, transmission can be performed in various ways and using any number of communications protocols, such as through direct point-to-point transmission, broadcast or multicast, over a communication network, as a serial bit stream, in parallel bit streams, or wirelessly.

Figure 2:
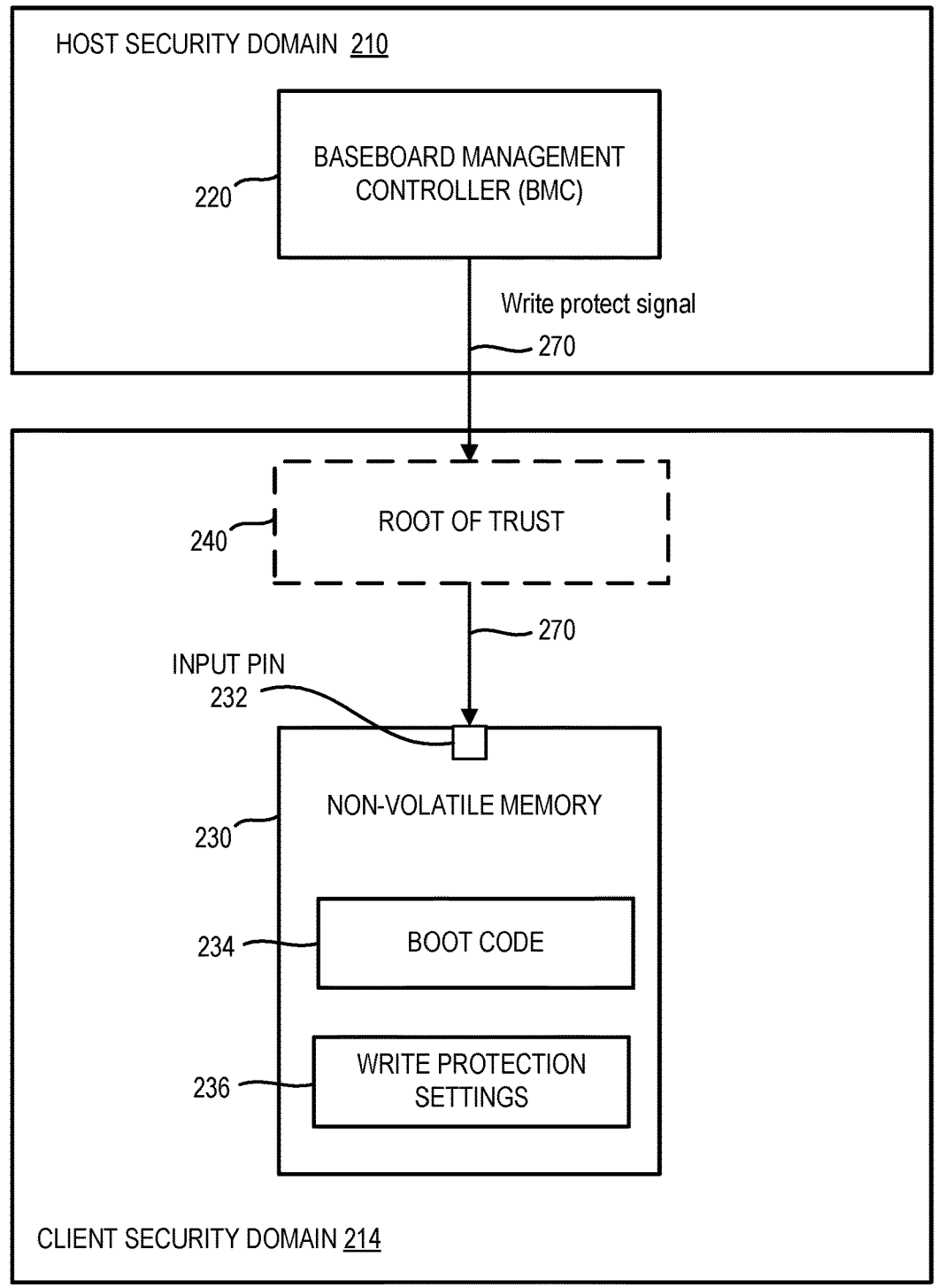
FIG. 2 shows an example of a write protection scheme according to some embodiments.

FIG. 1 shows an example of a write protection scheme according to some embodiments. The write protection scheme depicted in FIG. 1 involves a write protect command 172 generated based on a write protect (WP) signal 270. An alternative write protection scheme is shown in FIG. 2, discussed below. The write protection scheme in FIG. 2 involves direct input of the WP signal 270. Establishing write protection through a write protect command is more complicated, but in some cases this is unavoidable because the memory being write protected does not support direct input of a write protect signal. For example, as discussed below, the write protection scheme of FIG. 2 can be implemented using Serial Peripheral Interface (SPI) flash memory. However, SPI flash tends not to scale well and is subject to memory size, cost, and performance constraints that make SPI flash technology unsuitable for many computing devices or systems that are currently under development. Alternative flash memory technologies may offer higher capacity, better performance, and/or lower cost, but generally have more complex input/output (I/O) interfaces in comparison to SPI flash devices. As such, the write protection scheme in FIG. 1 may be better suited for certain applications or usage scenarios.

Figure 3:
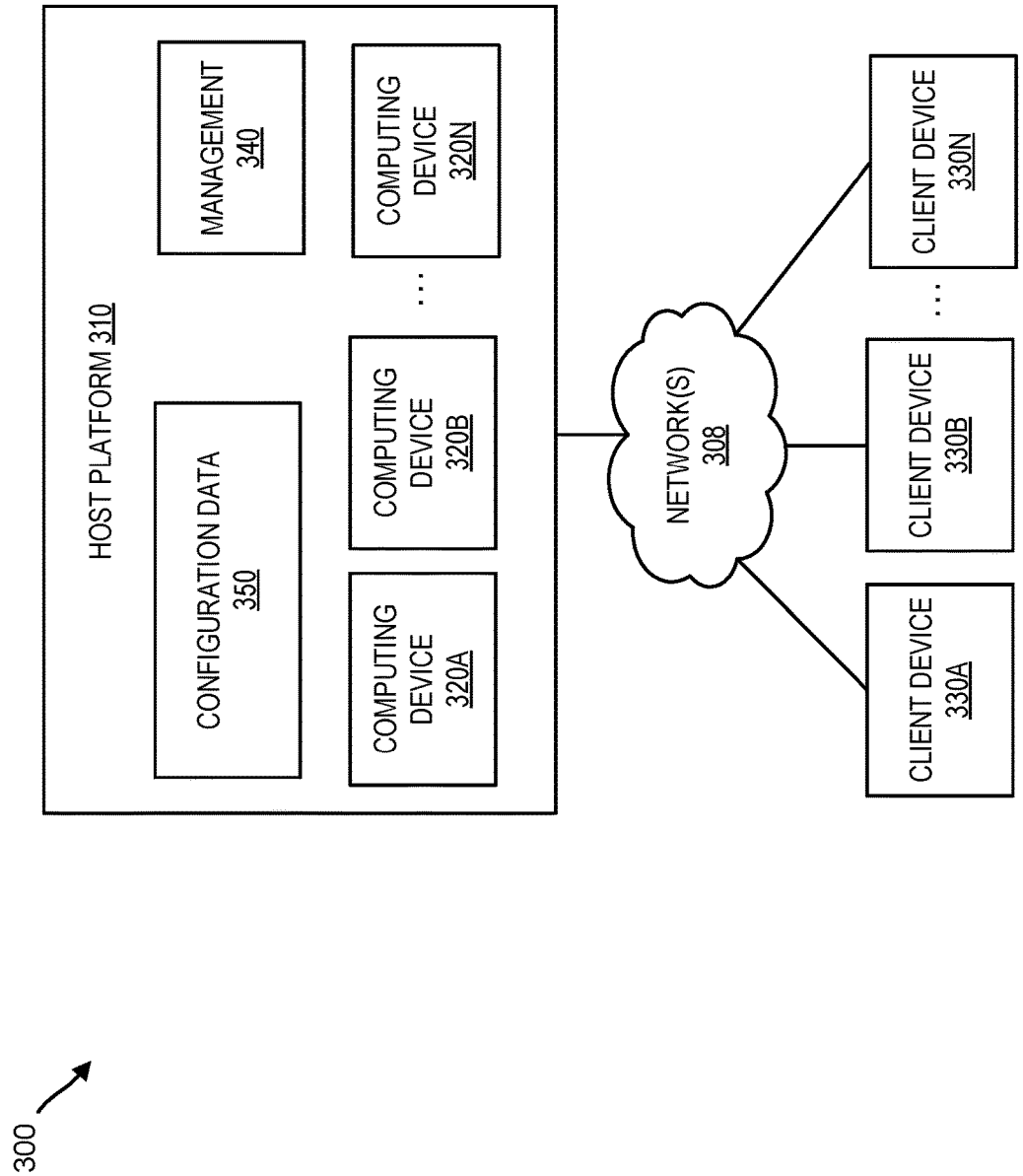
FIG. 3 shows a block diagram of an example computing environment in which one or more features disclosed herein may be implemented.

In FIG. 1, a computing device 100 is conceptually divided into a host security domain 110 and a client security domain 114. Each security domain is managed or controlled, at least in part, by a respective entity. For example, the host security domain 110 may represent one or more components of the computing device 100 that are managed by a trusted entity such as the operator of a host platform (e.g., a cloud service provider), while the client security domain 114 may represent one or more components that are managed by a user of the computing device 100. An example of a computing environment featuring a host platform is shown in FIG. 3, discussed below. Additionally, the host security domain 110 may, in some instances, include a host processor or other components of a host system such as the host system shown in FIG. 7, discussed below. A host system can include components spanning multiple security domains and/or sub-domains and can also be a distributed system with multiple computing devices.

Host security domain 110 includes a baseboard management controller (BMC) 220. The BMC 220 is configured to assert the WP signal 270 whenever the computing device 100 is powered on. As shown in FIG. 1, the host security domain 110 is divided into a first sub-domain 102 and a second sub-domain 104. The BMC 220 is a component in the first sub-domain 102. The second sub-domain 104 includes a hypervisor 120 and a power management unit 122. Interactions between the sub-domains 102 and 104 may be restricted for security reasons. As such, a component in the first sub-domain 102 may have limited or no access to a component in the second sub-domain 104 and vice versa. For example, the hypervisor 120 may have no access or visibility into the BMC 220. Although some communication may occur between the hypervisor 120 and the BMC 220, the hypervisor 120 may not be able to directly observe the internal state of the BMC 220 or to detect the status of signals generated by the BMC (e.g., the WP signal 270). Similarly, the BMC 220 may not be able to communicate the status of the BMC's signals to the hypervisor 120. As such, the hypervisor 120 may not be able to determine whether the WP signal 270 has been processed successfully. In fact, the hypervisor 120 may be completely unaware of how the WP signal 270 is being handled.

Hypervisor 120 can be a virtual machine manager (VMM) that is running on a host processor and responsible for supervising the execution of virtual machines (VMs). For example, the hypervisor 120 may create, start, monitor, stop, or delete VM instances executing on one or more processing units within the computing device 100 or across different computing devices. In some cases, the hypervisor 120 may configure a set of VMs to provide functionality corresponding to components in a physical machine or system, thereby emulating the physical machine or system in a virtualized environment. Each VM may be assigned corresponding resources, e.g., a virtual address space separate from virtual address spaces assigned to other VMs. In a cloud computing scenario, a VM may be deployed in connection with providing one or more cloud services to a tenant. Because the tenant generally does not own the resources, control over the resources or the VM itself may at times revert back to the host platform or be turned over to another tenant. Further, different tenants or clients can run their respective applications in a virtualized environment on the same hardware concurrently. The hypervisor 120 may also be responsible for virtual machine scheduling and enforcing isolation between different VMs, e.g., so that one VM cannot access memory allocated to another VM. The hypervisor 120 can also manage the flow of information between software, virtualized hardware, and physical hardware.

Client security domain 114 can include one or more software applications that are supplied by a user. For instance, the user may load a program authored by a third-party vendor onto the computing device 100. In some cases, a user application may be an application that is supplied by the trusted entity and further configured by the user through, for example, installing a software extension in the form of an add-on or plugin that provides functionality not included in the user application as given "out of the box" to the user. Because the client security domain 114 may include components that are not fully controlled by or, in some cases, even visible to components in the host security domain 110, the components residing in the client security domain may be untrusted and as such, represent potential security risks. More generally, components in the client security domain 114 can potentially behave in ways unintended and/or not permitted by the trusted entity. To minimize the likelihood that the computing device 100 is misconfigured in a way that compromises the performance of the computing device or the integrity of the host platform, portions of memory residing in the client security domain 114 that store content affecting the ability of the components in the client security domain to interact with the host platform (or other components managed/configured by the trusted entity) may be write protected with the aid of the WP signal 270. In FIG. 1, the memory storing such content is a non-volatile memory (NVM) 130.

NVM 130 can be any non-volatile memory that is incapable of receiving a write protect signal. For example, the NVM 130 may lack a dedicated input pin for receiving the WP signal 270. Nevertheless, the NVM 130 may still be capable of accepting a write protect command. The write protect command can be an instruction specifically provided for in the instruction set architecture of the NVM 130 and may include one or more fields that are settable to specify the manner in which the NVM 130 is to be write protected, e.g., for how long and in which memory areas. As a specific example, the NVM 130 can be an embedded MultiMedia- Card (eMMC) or Universal Flash Storage (UFS) device. When the NVM 130 is implemented as an eMMC device, the write command can be an instruction that writes to an extended Card Specific Data (CSD) register as defined in JEDEC Standard No. 84-B51A (version 5.1 of the eMMC electrical standard). UFS devices are governed by JEDEC Standard No. 220E. Both of these JEDEC standards specifically provide for a write protect command. In general, the NVM 130 may include a control register or other internal storage area (not shown) provided for storing write protection settings.

As shown in FIG. 1, the WP signal 270 can be input to a root of trust (RoT) 140 that issues the WP command 172 to the NVM 130 in response to receiving the WP signal 270. The WP command 172 is received through an I/O interface 132 of the NVM 130. The I/O interface 132 can be a general communications interface used to send other types of commands and data, e.g., in connection with reading and writing the NVM 130. The RoT 140 can be implemented in hardware and/or software and may, for example, correspond to Read-Only Memory (ROM) code that is stored in a ROM device and executed during the early stages of a boot sequence. In some examples, the RoT includes one or more processing units on an integrated circuit chip, e.g., an application specific integrated circuit (ASIC). The RoT 140 can be a component supplied by a cloud service provider or some other trusted entity responsible for managing/configuring one or more devices within the host security domain 110. For example, the operator of a host platform could install the RoT 140 on the computing device 100 prior to handing over control of the computing device 100 to the user. Although the RoT 140 operates within and interacts with components residing in the client security domain 114, the RoT can be trusted because its behavior is configured by or on behalf of an entity associated with the host security domain, e.g., by an administrative user or a trusted vendor. Further, the RoT 140 can be trusted because the RoT may be permanently configured such that its behavior is fixed (immutable). For example, when implemented as ROM code, the program instructions that provide the functionality for generating the WP command 172 in response to the WP signal 270 are permanently stored in memory that cannot be erased or overwritten. Thus, the RoT 140 can be preconfigured in a manner that cannot be changed by a user of the computing device 100.

As discussed above, the hypervisor 120 and other components within the sub-domain 104 may have limited or no access to the BMC 220. In order to prove to a component in the sub-domain 104 that the WP signal 270 has been processed successfully, e.g., that the NVM 130 is currently write-protected, the computing device 100 may be provided with one or more hardware registers that store write-protect status information generated by the RoT 140. For example, the computing device 100 may include a lockable register 150 that is implemented as a Peripheral Component Interconnect Express (PCIe) register or a memory-mapped I/O (MMIO) register. In some examples, the register 150 and the RoT 140 are co-located in the same integrated circuit chip (e.g., an ASIC). The register 150 may store its lock status 154 in internal memory. Locking of the register 150 is analogous to setting the contents of a non-volatile memory to be read-only. In this example, the contents that are locked include a write protect flag 152, which can be a Boolean value indicating whether NVM 130 is write-protected (set to read-only). In some implementations, the register 150 may store additional information about the write-protect status of the NVM 130. For example, the register 150 can include bits that store information indicating whether NVM 130 is write-protected on a power-on basis or permanently, and bits indicating which areas (e.g., specific address ranges) within the NVM 130 are write-protected. Because the contents of the register 150 are specified by a trusted component (RoT 140), a component reading the contents of the register 150 can be assured that the contents accurately reflect the current write-protect status of the NVM 130.

As shown in FIG. 1, the RoT 140 may communicate write-protect status information 162 to set the write protect flag 152. The RoT 140 can send the status information 162 concurrently with issuing the WP command 172. In some implementations, the RoT may wait for confirmation from the NVM 130 that write protection has been set before sending the status information 162. As part of sending the status information 162, the RoT 140 may also lock the register 150 once the write protect flag 152 and any other items of status information have been updated. In some implementations, the register 150 is kept locked unless its contents are being updated. For example, RoT 140 may be configured to unlock the register 150 during the boot sequence and in preparation for updating the write protect flag 152. Once the write protect flag 152 has been updated, the RoT 140 can lock the register 150 and keep the register 150 in the locked state until the next time the write protect flag 152 is being updated (e.g., the next time the computing device 100 is powered on).

Contents 170 of the register 150 can be read by any component with access to the register 150. In the example of FIG. 1, the register 150 is accessed by the hypervisor 120, which may be responsible for performing one or more security checks with respect to the computing device 100. As part of performing the security checks, the hypervisor 120 may be configured to periodically read the contents 170 from the register 150, e.g., to verify that the NVM 130 has been set to a write-protected state. For instance, the hypervisor may read from the register 150 each time a VM instance is launched, stopped, or restarted on the computing device 100. The contents 170 can be transmitted to the hypervisor 120 through an I/O interface 124. Like the I/O interface 132 of the NVM 130, the I/O interface 124 may be a general communications interface. In some implementations, the I/O interface 124 operates as an overall communications interface for the computing device 100 and may expose the NVM 130 and/or other components of the computing device 100 to external components, e.g., peripheral devices or network devices. As such, the I/O interface 124 and the I/O interface 132 may be communicatively coupled to each other. For instance, the I/O interface 124 may be a PCIe interface, and the I/O interface 132 may be an Advanced extensible Interface (AXI) connected to the I/O interface 124 through an AXI-PCIe bridge. Further, although the I/O interface 124 may be used to communicate with the computing device 100, FIG. 1 shows the WP signal 270 being directly input to the RoT 140. This is because the I/O interface 124 is not necessarily configured to handle the WP signal 270. However, it may be possible to send the WP signal 270 through the I/O interface 124 depending on how the I/O interface 124 is implemented.

Although the RoT 140 is configured to automatically set one or more areas of the NVM 130 to read-only in response to the WP signal 270, there may be times when it is desirable to write to the NVM 130. For example, the operator of a host platform may wish to update firmware or other content stored in the NVM 130. In order to update the firmware or other content, the operator may cause a reset signal 180 to be sent from the power management unit 122. In FIG. 1, the reset signal 180 is depicted as being input to the register 150. However, the reset signal 180 can be provided to any component that needs to be disabled as part of preventing the NVM 130 from becoming write-protected. For example, a separate reset signal may be sent to the RoT 140. In some embodiments, the reset signal 180 may be a PCIe Reset (PERST) signal that operates as a global reset for the computing device 100. Further, as shown in FIG. 1, the reset signal 180 may be received at the I/O interface 124 of the computing device 100, in which case the I/O interface 124 can distribute the reset signal 180 to the register 150 and any other components as needed.

In some implementations, the reset signal 180 is applied to trigger a reboot of the computing device 100 in combination with temporarily disabling the BMC 220. With the BMC 220 disabled, the WP signal 270 will not be asserted when the computing device 100 boots up, thereby leaving the NVM 130 in a writeable state. Once the NVM 130 has been written, the power management unit 122 can trigger another reboot, e.g., by reasserting the reset signal 180. During the subsequent reboot, the BMC 220 can be reenabled to assert the WP signal 270 so that the RoT 140 in turn issues the WP command 172 to make the NVM 130 write-protected.

FIG. 2 shows an example of a write protection scheme according to some embodiments. Similar to FIG. 1, a computing device 200 in FIG. 2 is conceptually divided into a host security domain 210 and a client security domain 214. As shown in FIG. 2, the host security domain 210 may include the BMC 220 which, as described above with respect to FIG. 1, can be configured to generate the WP signal 270. The BMC 220 can be an on-board controller mounted on the same circuit board or substrate as the circuits that form a compute subsystem of the computing device 100 or 200. However, in other embodiments, the component generating the WP signal 270 may be located on a separate board and, as such, can be referred to more generally as a security controller, or simply controller.

The BMC 220 can be an actively managed component that may, for example, be controlled remotely by the trusted entity. Alternatively or additionally, the BMC 220 may be realized as a hardware device that is preconfigured to generate the WP signal 270 without requiring the trusted entity to intervene in the operations of the computing device 200. Irrespective of whether the BMC is actively or passively managed, it can be configured to generate the WP signal 270 in accordance with configuration performed by or on behalf of the trusted entity. For example, the BMC 220 may be configured to assert the WP signal 270 whenever the computing device is powered on, as discussed above. Accordingly, the trusted entity can determine the manner in which the WP signal is 270 generated including, for example, the conditions under which the WP signal 270 is asserted and the duration over which the WP signal 270 is asserted.

Client security domain 214 is analogous to the client security domain 114 in FIG. 1 and includes an NVM 230. In FIG. 2, write protection is applied to boot code 234 residing in the NVM 230. As shown in FIG. 2, the NVM 230 receives the WP signal 270 through an input pin 232. The WP signal 270 may be transmitted directly from the BMC 220 to the input pin 232 or through an optional RoT 240. The input pin 232 can be a dedicated pin provided specifically for receiving the WP signal 270. For example, NVM 230 may be a Serial Peripheral Interface (SPI) flash memory that has an internal SPI communications bus. SPI flash technology is not standardized, and various manufacturers of SPI flash devices have implemented their own memory designs. However, the pin layout of SPI flash devices generally includes a write protect pin that can be used to set write protection, with the SPI flash device being configured to disable writing of the memory in response to detecting a signal at the write protect pin, and to keep writing of the memory disabled as long as this signal continues to be applied to the write protect pin.

In response to the WP signal 270, the NVM 230 may configure write protection settings 236 to indicate that the NVM (or a portion thereof) is now read-only. As discussed above in connection with FIG. 1, write protection settings can be configured through issuing a command that sets the contents of a control register internal to the NVM. However, it is not necessarily the case that the WP signal 270 causes an internal register of the NVM 230 to be written. For example, in a SPI flash device, there may not be any internal control register for storing write protection settings. More generally, the input pin 232 may be communicatively coupled to a control system (not shown) that is internal to the NVM 230 and responsible for enforcing write protection based on the status of the signal received through the input pin 232. One benefit of maintaining stored write protection settings is greater control over the memory. For instance, the write protection settings 236 may be configured to specify a memory address range over which the write protection applies as opposed to, for example, global write protection over the entire NVM 230.

Depending on implementation, the WP signal 270 may need to be continuously asserted in order to maintain write protection. For example, the NVM 230 may be configured to poll a control register storing the write protection settings 236 to detect any changes to the contents of the control register. If the WP signal 270 is deasserted, this may cause the contents of the control register to be changed such that the NVM reverts to a writable state. However, in some implementations, the write protection settings 236 can be maintained even after the WP signal 270 is deasserted. For example, the RoT 240 may only be configured to update the contents of the control register storing the write protection settings 236 once per power cycle, in which case the write protection settings 236 could be maintained at least until the next time the computing device 200 is powered on or rebooted.

FIG. 3 shows a block diagram of an example computing environment 300 in which one or more features disclosed herein may be implemented. The computing environment 300 may be a cloud environment in which a service provider operates a host platform 310 to provide access to cloud services. For example, the host platform 310 may include one or more computing devices 320 (e.g., 320A to 320N) that are configured to provide on-demand access to compute, storage, and/or networking resources to one or more client devices 330 (e.g., 330A to 330N). In one example, the host platform 310 may be configured to execute, on top of software supplied by the operator of the host platform, software supplied or configured by a user of a client device 330. For instance, the host platform 310 may offer cloud services that are delivered according to a Software as a Service (SaaS) or Platform as a Service (PaaS) model. At least some of the devices 320 and 330 may correspond to an instance of a computing device as described above with respect to FIGS. 1 and 2.

The computing environment 300 can be a multi-tenant environment, in which case the client devices 330 may be operated by users associated with different organizations. In a multi-tenant scenario, the host platform 310 may implement various security mechanisms to ensure that resources deployed for use by one tenant are not accessible or, in some cases, even visible to another tenant. For example, the host platform 310 may segregate tenant data residing in one or more databases of the host platform and restrict user access to the tenant data, using an access management system that provides authentication and authorization services. Further, because the resources provided by the host platform 310 may be reallocated or reconfigured over time, it may be beneficial to provide a security mechanism that prevents misconfiguration of the resources. For example, each computing device 320 and/or each client device 330 may operate using program instructions (e.g., boot code) or configuration settings stored in a non-volatile memory of the device (e.g., NVM 130 or 230). The instructions or configuration settings may be provided by the operator of the host platform 310 and, in some instances, may implement functionality that is customized for a specific tenant. Setting the non-volatile memory to be read-only can prevent the underlying configuration of the device 320 or 330 from being modified.

Computing devices 320 may include hardware such as a server having one or more processing units, for example, a central processing unit (CPU), a graphics processing unit (GPU), a field programmable gate array (FPGA), and/or the like. Hardware components can also include any number of peripheral devices that are communicatively coupled to the computing device. In some instances, a computing device 320 or a component within a computing device 320 may be implemented using integrated circuits. For example, an application specific integrated circuit (ASIC) may include circuitry designed to perform one or more types of processing tasks. The ASIC can be a processing component of an accelerator device that supports the operation of a general-purpose processor (e.g., CPU). For instance, the ASIC may correspond to a neural network accelerator or a graphics engine in a GPU. In some instances, the entire computing device may be implemented as a System on Chip (SoC).

As shown in FIG. 3, the host platform 310 may be communicatively coupled to the client devices 330 through one or more communication fabrics or networks 308. The network(s) 308 can include an intranet, the Internet, a cellular network, a local area network, or any other such network or combination thereof. Network components can depend at least in part upon the type of network and/or environment selected. Examples of network components include routers, switches, load balancers, Domain Name System (DNS) servers, and the like. Protocols and components for communicating via such networks are well known and will not be discussed herein in detail. Communication over the networks 308 can involve wired or wireless connections, and combinations thereof.

Client devices 330 can include general-purpose computers such as laptops, tablets, desktop computers, smartphones, and the like. Another example of a client device 330 is an Internet of Things (IoT) device. In some instances, a client device 330 may include hardware or software components that are configured by the operator of the host platform 310. For example, like the computing devices 320, the client devices 330 may operate using instructions or configuration settings supplied by the operator of the host platform, with the instructions or configuration settings being stored in a non-volatile memory of the device. In the case of a client device, the instructions or configuration settings may be processed to set up the client device for communications with the host platform and/or execution of higher level software, e.g., a user application installed on a user area of the non-volatile memory or on a separate memory. The instructions or configuration settings may be processed as part of a boot sequence for the device 320 or 330. For instance, each time the device is power-cycled in connection with a reset operation (e.g., a hard reboot or a soft reboot), the device may obtain the instructions or configuration settings from the non-volatile memory and process this content to place the device into a run-time state, e.g., a state where one or more user applications are executing within an operating system.

Because the contents of the non-volatile memory are retained even when power is turned off to the device 320 or 330, the same content can be obtained each time the device performs a boot sequence. However, the contents can be modified (e.g., overwritten) unless the non-volatile memory is write-protected. If the contents are modified, the run-time behavior of the device may become unpredictable. In a multi-tenant environment, this can potentially result in the device accessing resources that it should not have access to, e.g., data belonging to another tenant. For example, a malicious user could modify the contents of a device associated with a first tenant to impersonate a device associated with a second tenant or create a backdoor to a database maintained by the host platform on behalf of the second tenant.

Host platform 310 may include a management system 340 that implements one or more security mechanisms to monitor the devices 320 or 330. The management system 340 may periodically audit the devices to perform a check against configuration data 350 maintained by the host platform 310. The configuration data 350 may, for example, include a copy of firmware code or configuration settings that were programmed into a computing device 320 or a client device 330 by the operator of the host platform prior to handing over control or access of the device to a user. In some instances, a security check may involve validating the contents of memory, which can include the non-volatile memory discussed above as well as volatile memory. For example, a cryptographic hash may be used to confirm that the contents have not been modified. However, it may not be feasible to check the contents across all the devices operating under the host platform. Depending on the number of computing devices 320 and client devices 330, the frequency with which a full audit or comprehensive security check is performed may be limited. Instead, such an audit or security check may only be performed periodically or on a case-by-case basis, e.g., in response to flagging of suspicious device behavior. Nevertheless, the host platform 310 may be reasonably confident that the devices are properly configured if the write-protected status of memory areas storing sensitive content (e.g., firmware configured by the operator of the host platform or some other trusted entity) is verified, e.g., using the techniques described herein.

Figure 4:
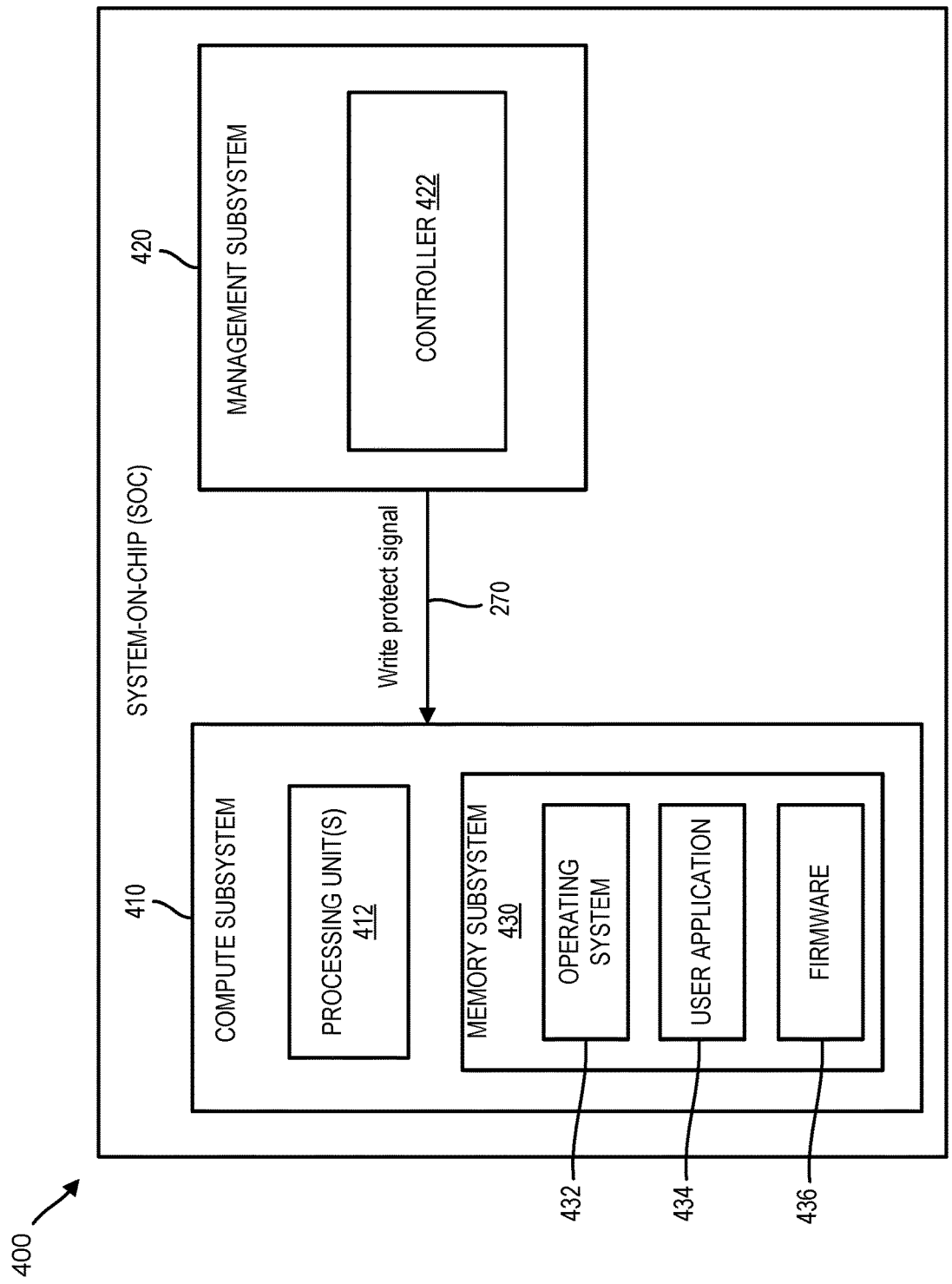
FIG. 4 is a block diagram of a computing device with write protection capabilities.

FIG. 4 is a block diagram of a computing device 400 with write protection capabilities. The computing device 400 may correspond to any of the computing devices described above with respect to FIGS. 1-3. In the example of FIG. 4, computing device 400 is implemented as an SoC integrated circuit having a compute subsystem 410 and a management subsystem 420. The management subsystem 420 may be configured to manage different components of the computing device 400. In some cases, the management subsystem 420 may configure one or more components at power up, to enable or disable certain capabilities of the computing device 400. In the example of FIG. 4, the management subsystem 420 includes a controller 422 configured to generate the WP signal 270. For example, controller 422 may correspond to the BMC 220 in FIGS. 1 and 2. Because the controller 422 is embedded in the SoC, the controller 422 may be coupled to the same power source (not shown) that supplies power for the rest of the computing device 400. As such, the controller 422 may assert the WP signal 270 each time the computing device 400 is powered on. The WP signal 270 can be a digital signal, in which case asserting the WP signal may involve setting the WP signal to logic high (1), and deasserting the WP signal may involve setting the WP signal to logic low (0). Alternatively, the WP signal 270 can be an "active low" signal that is asserted by setting the WP signal to logic low and deasserted by setting it to logic high. As another example, the WP signal may be an analog signal.

Compute subsystem 410 includes one or more processing units 412 and a memory subsystem 430. The processing units 412 can be implemented using digital and/or analog circuits and can include processing units that perform general computing tasks (e.g., arithmetic or logical operations) as well as processing units that perform specialized computing tasks such as graphics computations or neural network operations (e.g., matrix multiplication).

Memory subsystem 430 can include one or more memory devices that store instructions and data used by the processing units 412. For example, as shown, the memory subsystem 430 may include an operating system 432, a user application 434, and firmware 436. In general, software installed on the memory subsystem 430 is stored in non-volatile memory (NVM). For instance, firmware 436 may be stored on a flash memory device. The software in the memory subsystem 430 can be distributed across multiple memory devices. As one example, operating system 432 may be located on a Read-Only Memory (ROM) separate from the flash memory device, and user application 434 may be located on an erasable programmable ROM (EPROM). Memory subsystem 430 may also include volatile memory such as static random access memory (SRAM) or dynamic random access memory (DRAM). Volatile memory can be used as working memory for run-time storage of data generated by software executing on the computing device 400.

WP signal 270 may, in some implementations, be input directly to a memory being write protected. For example, the WP signal 270 may be coupled to an input pin of an NVM, as shown in FIG. 2. Accordingly, the memory device storing the firmware 436 may, in some instances, receive the WP signal 270 from the controller 422. However, as discussed above, not all NVMs support direct input of a write protect signal. To enable write protection on an NVM that does not support such direct input, some embodiments feature an intermediary component configured to issue instructions to the NVM. As discussed above in connection with FIG. 1, this intermediary component may operate as a root of trust (RoT) that generates a write protect command in response to the WP signal, e.g., based on detecting that the WP signal 270 is asserted.

Write protection does not need to be applied to the entirety of the memory subsystem 430. For instance, it may be desirable to permit a memory device storing the user application 434 to be writable so that a user can update the user application 434 or install additional user applications for execution by the compute subsystem 410. In contrast, memory storing instructions or data relating to the underlying configuration of the computing device 400 (e.g., firmware 436) should generally remain write-protected, i.e., read-only, at least whenever the computing device 400 is running.

Additionally, it can be beneficial to establish write protection in a non-permanent manner so that the contents of a write-protected memory can be updated as needed by a trusted entity such as the operator of the host platform 310 in FIG. 3 (e.g., a cloud service provider). Accordingly, in some embodiments, write protection may be enabled on a power-on basis such that a memory is kept read-only as long as power is supplied to the computing device (and therefore the memory), while permitting the write protection to be disabled through preventing the controller 422 from asserting the WP signal 270 when the computing device 400 is reset. For example, the controller 422 may include an I/O interface accessible only to the operator of the host platform 310 and which may be used to deactivate the controller 422 in preparation for updating the firmware 436. The I/O interface of the controller 422 can be accessed through a direct (e.g., wired) connection to the controller. Alternatively, the I/O interface may be configured for remote access, e.g., through communication between the computing device 400 and the host platform 310 over one or more networks 308.

Figure 5:
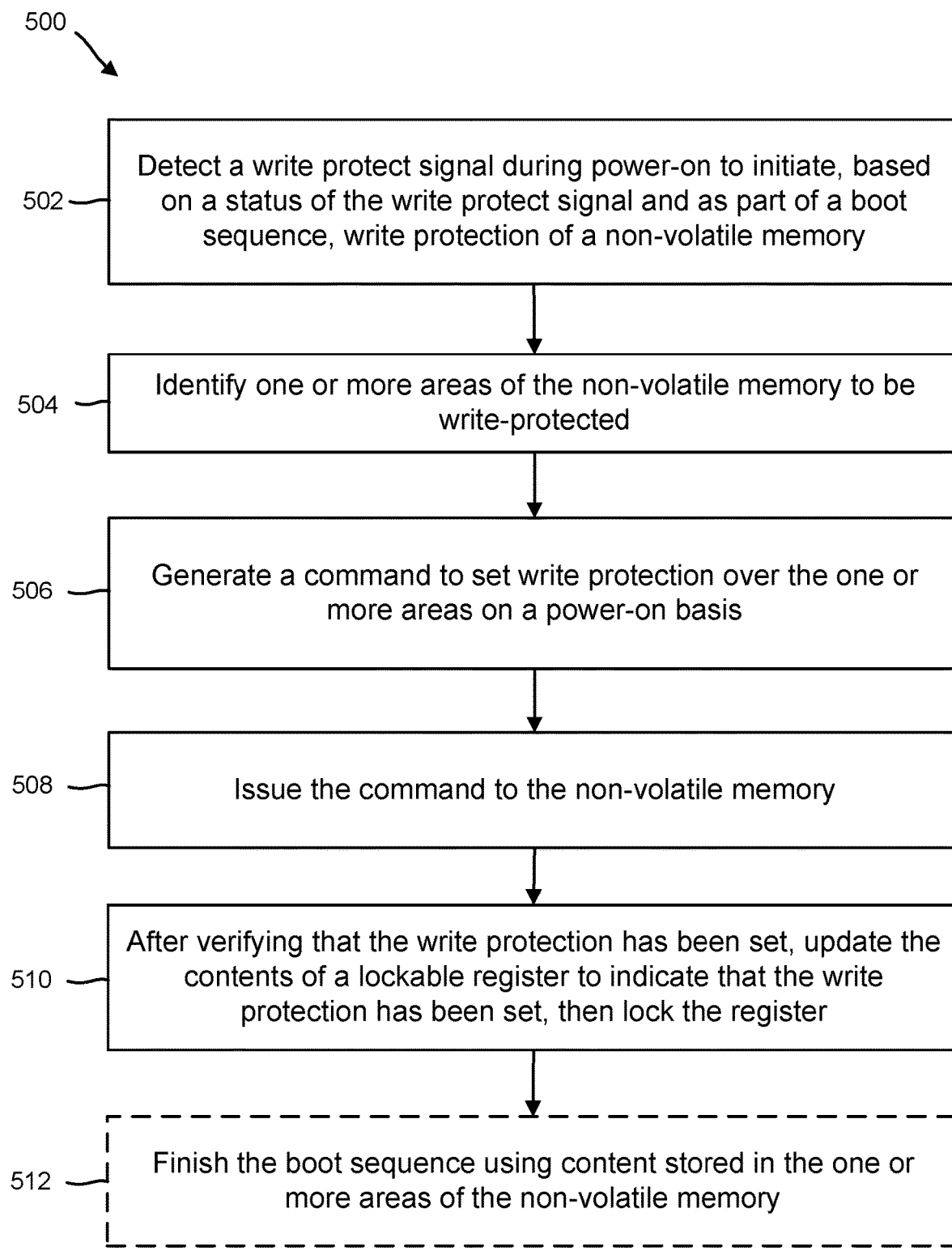
FIG. 5 is a flow diagram of an example method for establishing write protection on a non-volatile memory, according to certain aspects of the disclosure.

FIG. 5 is a flow diagram of an example method 500 for establishing write protection, according to certain aspects of the disclosure. The method 500 can be performed by one or more processing units of a computing system or device that includes an NVM. In some embodiments, the processing unit(s) performing the method 500 implement an RoT as described above in connection with FIG. 1.

At block 502 a write protect signal (e.g., WP signal 270) is detected during power-on. The WP signal can be generated by a security controller such as the BMC 220. Depending on implementation, the security controller may keep asserting the WP signal as long as power is supplied or deassert the WP signal after some time. In the example of FIG. 1, the WP signal 270 does not need to be kept asserted because the WP command 172 can be configured to set the NVM 130 to maintain write protection until the next power cycle. Based on the asserted status of the WP signal, the one or more processing units may, as part of the functionality in block 502, initiate write protection of a non-volatile memory (e.g., NVM 130). The detection of the WP signal can be performed during a boot sequence, which may be executed each time the computing system or device is powered on or rebooted, in order to prepare the computing system or device for run-time execution of one or more user applications.

At block 504, the processing unit(s) identify one or more areas of the NVM to be write-protected. The one or more areas can be set in advance. For example, the RoT may be hardwired or programmed with information indicating which memory addresses of the NVM store firmware or other content configured by a trusted entity (e.g., a cloud service provider).

At block 506, the processing unit(s) generate a command (e.g., WP command 172) to set write protection over the one or more areas identified in block 504. The command can be single instruction, but in some cases multiple instructions may be generated. For example, a first command may set write protection on a first area of the NVM (e.g., a boot area), and a second command may set write protection on a second area of the NVM (e.g., a user area or a general-purpose partition). This is because the content configured by the trusted entity (e.g., firmware instructions executed as part of a boot sequence) may be stored in other areas besides the boot area. The command in block 506 is also configured to set write protection on a power-on basis, meaning that the one or more areas of the NVM are set to read-only until the next power cycle. Once write protection is set, the NVM will ignore any subsequent commands to make the one or more areas writable until the non-volatile memory is power cycled, e.g., when power to the computing system or device having the NVM is turned off and then on again. This is advantageous because even though the NVM may be capable of being write protected permanently, it may be desirable to preserve the ability of the service provider or other trusted entity to update the contents of the non-volatile memory (e.g., a firmware update).

At block 508, the processing unit(s) issue the command to the NVM. As discussed above in connection with FIG. 1, the command may be sent through an I/O interface that lacks a dedicated pin for receiving a write protect signal. The I/O interface can be a general communications interface that is used to transmit instructions to the NVM and, in some implementations, data being written to or read out of the NVM.

At block 510, after verifying that the write protection has been set, the processing unit(s) update the contents of a lockable register (e.g., register 150) to indicate the write-protected status of the NVM. In some implementations, the NVM may be configured to send an acknowledgement message confirming that the command was executed successfully. Additionally or alternatively, the processing unit (s) can read back values that were programmed into the NVM by the command (e.g., bits of an extended CSD register or other control register associated with the NVM). After updating the lockable register to indicate that the write protection has been set, the processing unit(s) lock the register.

At block 512, the processing unit(s) may optionally finish the boot sequence using content stored in the one or more areas of the NVM. For example, the one or more areas may store boot code and/or configuration settings used to place the computing system or device into a run-time configuration. Because the NVM has been write-protected, the boot sequence can be completed with assurance that the contents have not been modified.

Figure 6:
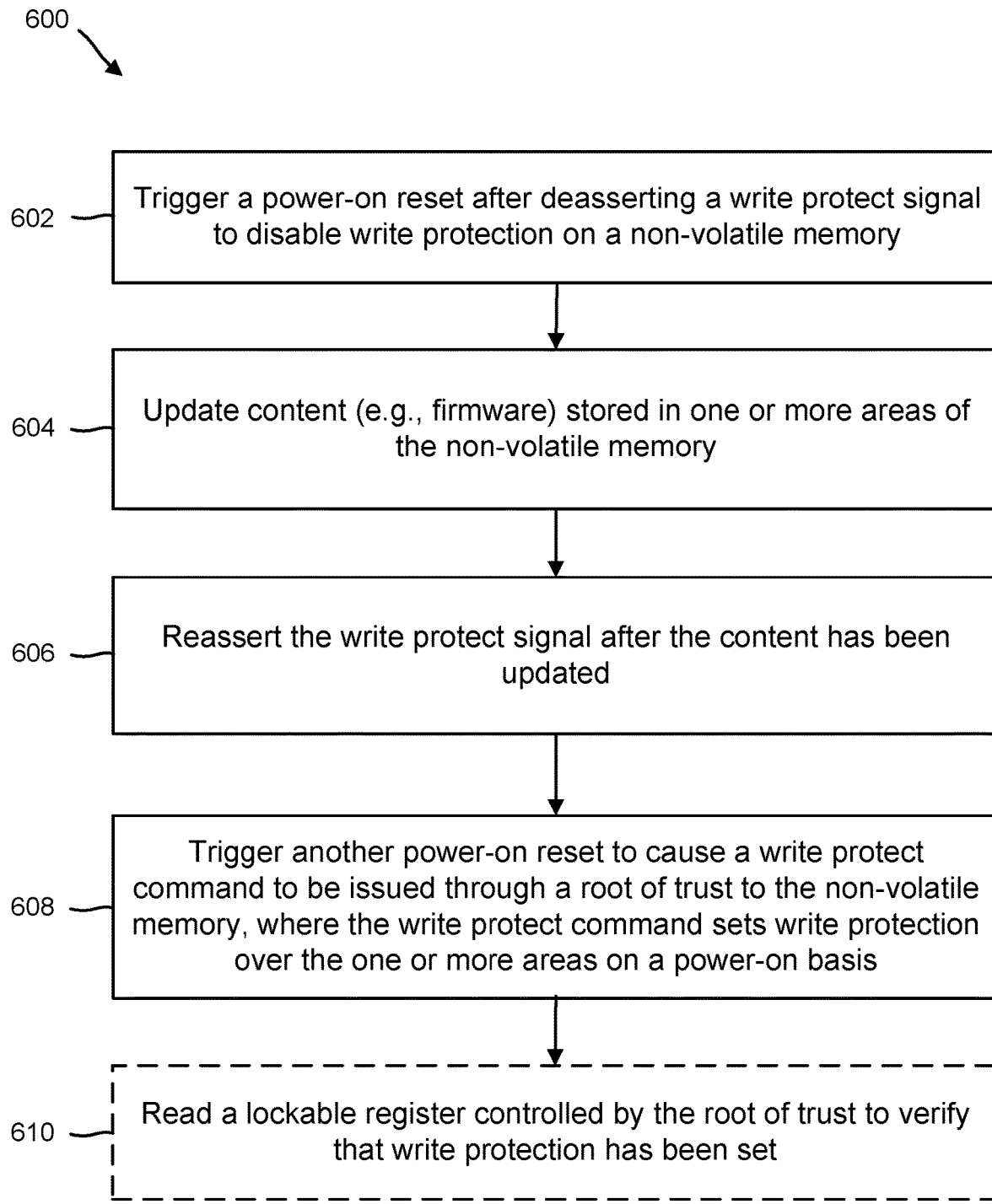
FIG. 6 is a flow diagram of an example method for updating the contents of a write-protected memory, according to certain aspects of the disclosure.

FIG. 6 is a flow diagram of an example method 600 for updating the contents of a write-protected memory, according to certain aspects of the disclosure. The method 600 can be performed by one or more processing units of a computing system or device that includes an NVM. In some embodiments, the processing unit(s) performing the method 600 implement a management subsystem that includes a security controller, such as the management subsystem 420 in FIG. 4. The processing unit(s) may be remotely located on a separate computing device (e.g., a separate device on the host platform 310) or integrated into the computing system or device having the NVM. In one example, at least some of the functionality in method 600 may be provided by a host processor or other processing unit residing in a host security domain, e.g., a processing unit that implements the BMC 220 as described above in connection with FIG. 1.

At block 602, the processing unit(s) trigger a power-on reset of the computing system or device having the NVM. The power-on reset is triggered in order to disable write protection on the NVM which, as discussed above, can be set to read-only on a power-on basis. In some implementations, the power-on reset is triggered using a reset signal issued by a power management unit (e.g., the reset signal 180). To prevent the NVM from becoming write protected after the reset in block 602, the BMC 220 or some other source of a write protect signal can be temporarily disabled so that the write protect signal does not get asserted.

At block 604, content stored in one or more areas of the NVM is updated by writing to the one or more areas. The content can include program instructions (e.g., firmware), data (e.g., configuration settings in the form of metadata), or a combination of instructions and data. For example, the NVM can be a flash memory that is updated through a flashing operation to overwrite existing firmware or data in the flash memory.

At block 606, the write protect signal is reasserted after the content stored in the one or more areas of the NVM has been updated. For instance, the BMC 220 or other source of the write protect signal can be reenabled to supply the write protect signal to the RoT 140.

At block 608, the processing unit(s) trigger another power-on reset to cause a write protect command (e.g., WP command 172) to be issued through the RoT to the NVM. Since the write protect signal has been reasserted, the RoT will be able to detect the write protect signal and issue a corresponding command that sets write protection over the one or more areas of the NVM, e.g., on a power-on basis as discussed above.

At block 610, the contents of a lockable register controlled by the RoT (e.g., register 150) may optionally be read to verify that write protection has been set. The lockable register can be read as part of performing a security check, e.g., a full or partial audit, on the computing system or device having the NVM. In some instances, the reading of the lockable register may be performed by a hypervisor such as the hypervisor 120.

In some embodiments, the non-volatile memory being write protected corresponds to memory in an acceleration engine. An acceleration engine can include one or more accelerators that perform particular types of operations much faster than when similar operations are performed by a general-purpose processor. Accelerators may include, for example, graphics accelerators, floating point accelerators, or neural network accelerators. An example of an accelerator-based computing system in which the write protection techniques described herein can be applied is shown in FIG. 7.

Figure 7:
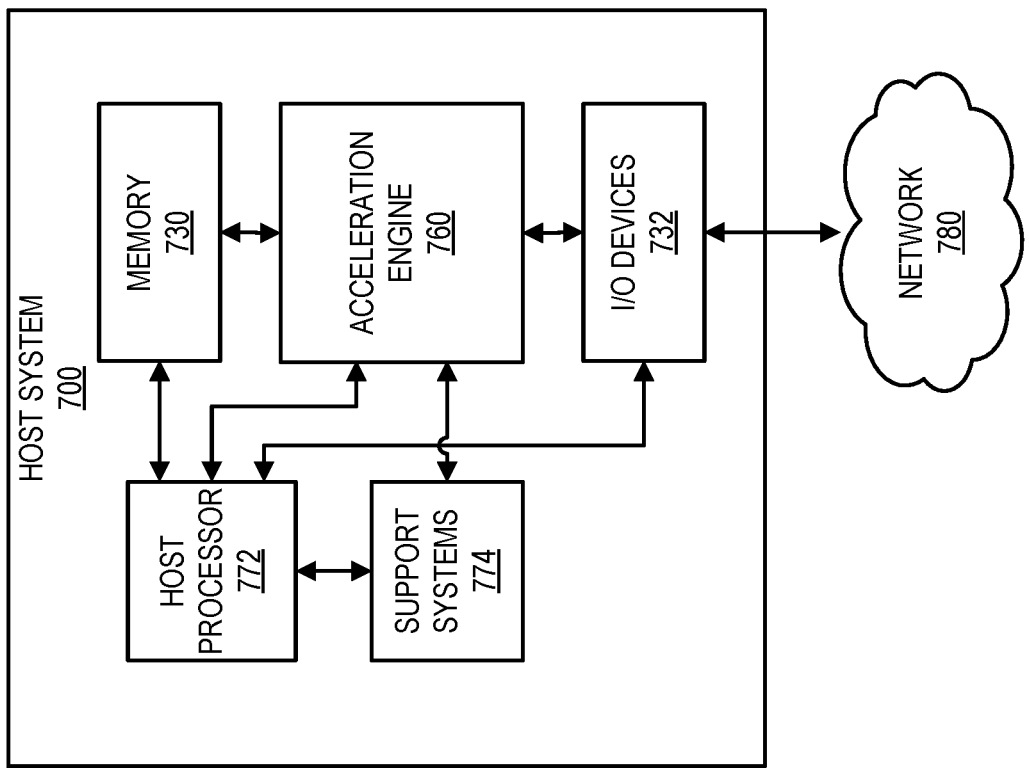
FIG. 7 is a block diagram showing an example of a host system in which one or more features disclosed herein may be implemented.

FIG. 7 is a block diagram that illustrates an example of a host system 700. The host system 700 includes an acceleration engine 760, a host processor 772, memory 730, I/O devices 732, and support systems 774. In various implementations, the host system 700 can include other hardware that is not illustrated here.

The host processor 772 is a general-purpose integrated circuit that is capable of executing program instructions. In some examples, the host processor 772 can include multiple processing cores. A multi-core processor may include multiple processing units within the same processor. In some examples, the host system 700 can include more than one host processor 772. In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the memory 730. As another example, the host system 700 can include an I/O bus, such as a PCI-based bus, over which the host processor 772 can communicate with the acceleration engine 760 and/or the I/O devices 732. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program designed for language translation can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network.

The memory 730 can include working memory used by the host processor 772 for storage of program code that the host processor 772 is in the process of executing, as well as values that are being operated on. In some examples, the data for a neural network (e.g., weight values, instructions, and other data) can be all or partially stored in DRAM or some other volatile memory. Additionally, the memory 730 can include non-volatile memory storing content that is write-protected (e.g., NVM 130 in FIG. 1). As one example, the host system 700 can include a ROM that stores boot code for booting the host system 700 at power on, and/or Basic Input/Output System (BIOS) code. Accordingly, the memory 730 may include a combination of volatile and non-volatile memory devices.

Though not illustrated here, the memory 730 can store instructions for various programs, which can be loaded into and be executed by the host processor 772. For example, the memory 730 can store instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controlling peripheral devices, among other operations. In some examples, a host system 700 may host one or more virtual machines. In these examples, each virtual machine may be configured to execute its own operating system. Examples of operating systems include Unix®, Linux®, Windows®, macOS® iOS®, Android™, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application programming interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the memory 730, and any other memory component in the host system 700 are examples of computer-readable storage media. Computer-readable storage media are physical mediums that are capable of storing data in a format that can be read by a device such as the host processor 772 or the acceleration engine 760. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources.

In some examples, a PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network preconfigured on the acceleration engine 760. In some examples, the support systems 774 may need to load the data for the neural network onto the acceleration engine 760 before the acceleration engine 760 can start executing the neural network. In these and other examples, the support systems 774 can further receive the output of executing the neural network and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 8:
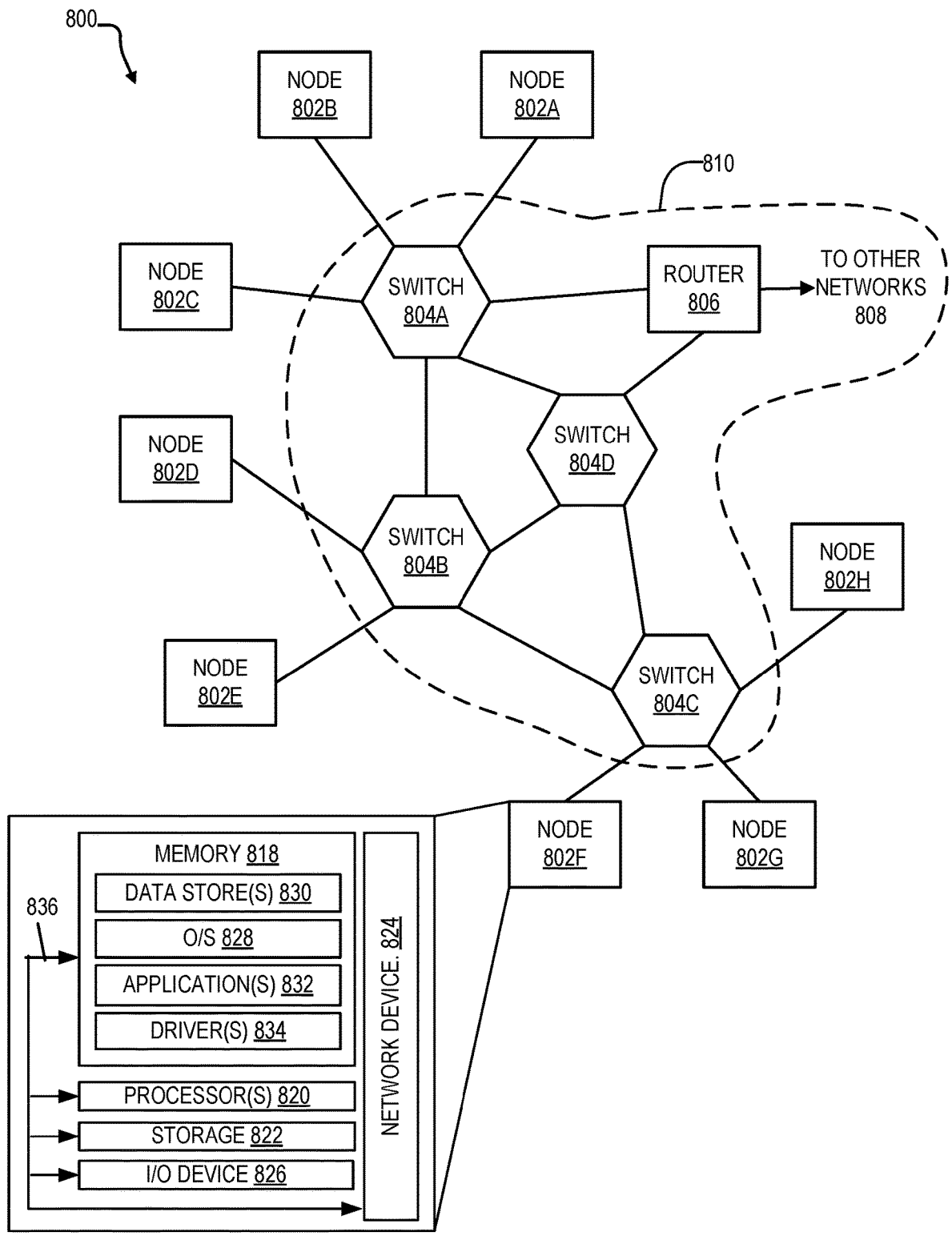
FIG. 8 illustrates an example network in which one or more features disclosed herein may be implemented.

FIG. 8 shows an example network 800, which can include one or more host systems, such as the host system illustrated in FIG. 7. For example, the network 800 of FIG. 8 includes multiple nodes 802a-802h, one or more of which can be a host system such as illustrated in FIG. 7. Others of the nodes 802a-802h can be other computing devices, each of which include at least a memory for storing program instructions, a processor for executing the instructions, and a network interface for connecting to the network 800.

In various examples, the network 800 can be used to process data. For example, input data can be received at one of the nodes 802a-802h or from other networks 808 with which the network 800 can communicate. In this example, the input data can be directed to a node in the network 800 that includes an acceleration engine, for the acceleration engine to operate on and produce a result. The result can then be transferred to the node or other network from which the input data was received. In various examples, input data can be accumulated from various sources, including one or more of the nodes 802a-802h and/or computing devices located in the other networks 808, and the accumulated input data can be directed to one or more host systems in the network 800. Results from the host systems can then be distributed back to the sources from which the input data was gathered.

In various examples, one or more of the nodes 802a-802h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 8, the nodes 802a-802h are connected to one another using a switched architecture with point-to-point links. The switched architecture includes multiple switches 804a-804d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 804a-804d of FIG. 8 may be connected to the nodes 802a-802h and provide multiple paths between any two nodes.

The network 800 may also include one or more network devices for connection with other networks 808, such as a router 806. Routers use headers and forwarding tables to determine the best path for forwarding the packets, and use protocols such as internet control message protocol (ICMP) to communicate with each other and configure the best route between any two devices. The router 806 of FIG. 8 can be used to connect to other networks 808 such as subnets, LANs, wide area networks (WANs), and/or the Internet.

In some examples, network 800 may include any one or a combination of many different types of networks, such as cable networks, the Internet, wireless networks, cellular networks and other private and/or public networks. The interconnected switches 804a-804d and the router 806, if present, may be referred to as a switch fabric 810, a fabric, a network fabric, or simply a network. In the context of a computer network, terms "fabric" and "network" may be used interchangeably herein.

The nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application programming interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. In some implementations, the network device 824 is a peripheral device, such as a PCI-based device. In these implementations, the network device 824 includes a PCI interface for communicating with a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer system, comprising:
an electronic controller configured to assert a write protect signal each time the computer system is powered on;
an integrated circuit chip communicatively coupled to the electronic controller; and
a non-volatile memory communicatively coupled to the integrated circuit chip,
wherein the integrated circuit chip comprises a hardware register storing a write protection status of the non-volatile memory, and one or more processing units implementing a root of trust,
wherein the root of trust has been permanently configured to issue, as part of a boot sequence and in response to the write protect signal, a write protect command to the non-volatile memory, update the hardware register to indicate that one or more areas in the non-volatile memory is write-protected, and lock the hardware register after updating the hardware register,
wherein the write protect command sets the one or more areas in the non-volatile memory to be read-only as long as the non-volatile memory remains powered on,
wherein the non-volatile memory is configured to, based on the write protect command, ignore any subsequent commands to make the one or more areas writable until the non-volatile memory is power cycled,
wherein the integrated circuit chip is configured to complete the boot sequence using instructions or data stored in the one or more areas, and
wherein the locked hardware register is read by a host processor to verify that the non-volatile memory is write-protected as part of a security check performed on the integrated circuit chip.

2. The computer system of claim 1, wherein the one or more areas in the non-volatile memory being write-protected include an area that is used to store boot code.

3. A computing device, comprising:
one or more processing units implementing a root of trust;
a non-volatile memory; and
a hardware register configured to store a write protection status of the non-volatile memory,
wherein the root of trust is configured to:
detect a write protect signal that is asserted by an electronic controller each time the computing device is powered on;
issue, in response to the write protect signal, a write protect command to the non-volatile memory;
update the hardware register to indicate that one or more areas in the non-volatile memory is write-protected; and
lock the hardware register after updating the hardware register,
wherein the write protect command sets the one or more areas in the non-volatile memory to be read-only,
wherein the non-volatile memory is configured to, based on the write protect command, keep the one or more areas read-only as long as the non-volatile memory remains powered on, and
wherein the hardware register is communicatively coupled to a host processor that is configured to verify that the non-volatile memory is write-protected through reading the write protection status of the non-volatile memory in the locked hardware register.

4. The computing device of claim 3, wherein the electronic controller is a baseboard management controller in the computing device.

5. The computing device of claim 3, wherein the computing device is configured to operate a virtual machine instance, and wherein the host processor is a hypervisor that manages the virtual machine instance.

6. The computing device of claim 3, wherein the host processor has no access or visibility into the electronic controller.

7. The computing device of claim 3, wherein the non-volatile memory is an embedded MultiMediaCard (eMMC) or Universal Flash Storage (UFS) device.

8. The computing device of claim 7, wherein the write protect command specifies content written to an internal control register in the non-volatile memory.

9. The computing device of claim 3, wherein the one or more areas include an area storing firmware instructions executed by the computing device as part of a boot sequence, and wherein the write protect command sets the area storing firmware instructions to be read-only.

10. The computing device of claim 9, wherein the area storing firmware instructions comprises a boot area, a user area, a general purpose partition, or a combination thereof.

11. The computing device of claim 3, wherein the non-volatile memory is configured to receive the write protect command through an input/output interface that carries control and data signals used to read and write the non-volatile memory.

12. The computing device of claim 3, wherein the computing device is configured to issue the write protect command through the root of trust prior to executing code stored in the one or more areas.

13. The computing device of claim 3, wherein:
the root of trust is implemented using firmware instructions executed by the one or more processing units;
the firmware instructions are stored in a read-only memory of the computing device; and
the read-only memory and the non-volatile memory are located on separate memory devices.

14. The computing device of claim 3, wherein the write protection status of the non-volatile memory is read from the locked hardware register when a virtual machine instance is launched or restarted.

15. The computing device of claim 3, wherein the write protection status of the non-volatile memory is read from the locked hardware register when a virtual machine instance is stopped.

16. The computing device of claim 3, wherein the hardware register is further configured to store a lock status of the hardware register.

17. A computer-implemented method, comprising:
detecting, by one or more processing units implementing a root of trust in a computing device, a write protect signal asserted by an electronic controller, wherein the write protect signal is asserted by the electronic controller each time the computing device is powered on;
issuing, by the root of trust in response to the write protect signal, a write protect command to a non-volatile memory of the computing device, wherein:
the write protect command sets one or more areas in the non-volatile memory to be read-only; and
the non-volatile memory is configured to, based on the write protect command, keep the one or more areas read-only as long as the non-volatile memory remains powered;
updating, by the root of trust and in conjunction with the issuing of the write protect command, a hardware register of the computing device to indicate that the non-volatile memory is write-protected;
locking, by the root of trust, the hardware register after the hardware register has been updated; and
providing a content of the locked hardware register to a host processor as verification that the non-volatile memory is write-protected.

18. The computer-implemented method of claim 17, wherein the non-volatile memory is an embedded MultiMediaCard (eMMC) or Universal Flash Storage (UFS) device.

19. The computer-implemented method of claim 17, further comprising receiving an acknowledgement from the non-volatile memory to confirm that the write protect command was executed successfully.

20. The computer-implemented method of claim 17, wherein the content of the locked hardware register is provided to the host processor when a virtual machine instance is launched, stopped, or restarted.

* * * * *